United States Patent
Renfroe

Patent Number: 5,842,596
Date of Patent: Dec. 1, 1998

[54] CASSEROLE CONTAINER

[76] Inventor: Kay W. Renfroe, 1013 Hicksmil Dr., Marietta, Ga. 30060

[21] Appl. No.: 674,446

[22] Filed: Jul. 2, 1996

[51] Int. Cl.$^6$ .................................................. B65D 25/34
[52] U.S. Cl. ...................... 220/739; 220/903; 220/23.86; 220/495.03; 206/514
[58] Field of Search ..................................... 220/903, 739, 220/464, 410, 420, 421, 408, 412, 468, 912, 574, 23.83, 23.86, 413, 460, 610, 677, 754, 771, 772, 495.03, 495.06, 62.13, 62.14, 62.21; 206/514

[56] References Cited

U.S. PATENT DOCUMENTS

| | | | |
|---|---|---|---|
| D. 254,416 | 3/1980 | Abbate | D7/22 |
| D. 316,360 | 4/1991 | Thorp | D7/565 |
| D. 321,306 | 11/1991 | Behar | D7/601 |
| 2,522,381 | 9/1950 | Kramer | 220/739 |
| 2,610,757 | 9/1952 | Irvine | 220/464 |
| 3,507,312 | 4/1970 | Hibbert | 220/410 |
| 3,979,145 | 9/1976 | Clemente et al. | 294/32 |
| 3,990,495 | 11/1976 | LaBarba | 220/903 |
| 4,401,245 | 8/1983 | Zills | 220/903 |
| 4,802,602 | 2/1989 | Evans et al. | 220/739 |
| 4,871,597 | 10/1989 | Hobson | 220/903 |
| 5,445,276 | 8/1995 | Gordon | 206/545 |
| 5,598,946 | 2/1997 | Davis | 220/739 |

FOREIGN PATENT DOCUMENTS

| | | | |
|---|---|---|---|
| 1269009 | 6/1961 | France | 220/903 |

*Primary Examiner*—Stephen J. Castellano

[57] ABSTRACT

In accordance with the present invention, a casserole container (12) includes a thermal jacket (12) which is manufactured from a generally lightweight, flexible insulative material and which can be expanded and/or contorted to receive casserole dishes (16) of varying sizes and shapes. The thermal jacket (12) fits securely within a slightly larger transport member (14), which is manufactured from a generally stronger and heavier material such as woven cloth or wool. The transport member (14) comprises a transport member top (14A) integrally woven to a transport member basin (14B). A transport member slit (14AC) bisects the transport member (14), creating an opening along one side of the transport member (14). A transport member top draw string (14AB), housed within an open channel formed along the leading edge of the transport member top (14A), enables the transport member (14) to be closed and opened. The thermal jacket (12) containing the casserole dish (16) is placed within the transport member (14), the transport member top (14A) is then pulled over and around the casserole dish (16) and the transport member top draw string (14AB) is then tightened and tied into a releasable knot, securing the casserole dish (16) inside the transport member (14).

5 Claims, 4 Drawing Sheets

CASSEROLE CONTAINER

BACKGROUND OF THE INVENTION

1. Field of the Invention

The present invention relates to a casserole container. More specifically, the present invention relates to an insulated casserole container comprising an interior thermal jacket which encases a casserole or other type dish and an exterior covering means which enables the same to be easily and safely transported.

2. Description the Prior Art

The tradition of transporting casserole dishes from one house to another is as common as the ancestral custom of presenting fruitcakes on Christmas. Typically, the casserole dish is placed either in a shopping bag or other container or is wrapped in foil and then carefully placed in a car for transport to a given destination. Upon arrival, one finds that the contents of the dish have cooled significantly or have been displaced and spilled over onto the car seat or floor. Another problem frequently encountered is that the dish is often too hot to carry or is too heavy to place in a bag or other container. Several improvements have been attempted to overcome the aforementioned difficulties associated with transporting casserole dishes. However, each said improvement falls short of the intended objectives of the present invention as hereinafter discussed.

U.S. Pat No. 5,445,276 to Gordon provides a removable food container attachment for lunch pails and coolers. The device comprises a bottom member having a plurality of storage compartments which is contoured to receive a lunch pail or small cooler. A sling is removably secured over said lunch pail or cooler and is used to carry the same. Although similar in some respects, this patent differs from the present invention because the present invention is designed for the storage and portage of casserole and other similar dishes and not lunch pails and/or coolers. Further, the present invention comprises an inner thermal jacket which is securely blanketed over a casserole dish and which is placed within an outer transport member comprising two integrally woven handles. The outer transport member further comprises a drawstring which enables the same to be tightened over the top of the dish. This features, which are essential to the present invention, are not disclosed in the present patent.

U.S. Pat. No. 3,979,145 to Clemente et al. discloses a hot pan handling device designed to be slid under a heavy or cumbersome hot pan to enable the same to be easily moved or turned. This patent differs from the present invention because the present invention comprises an interior insulating member and an exterior carrying member which fit within one another for the purpose of carrying casserole dishes and for ensuring that the same remain warm or hot during portage. These features are not disclosed in the present patent.

Des. U.S. Pat. Nos. 254,416 to Abbate and 316,360 to Thorp disclose designs for insulated bowls. Because a carrying means for casserole or related dishes is not provided, these patents differ from the present invention.

Des. U.S. Pat. No. 321,306 to Behar provides a design for a casserole caddy. The present invention differs from this patent because a thermal inner member which provides an insulated jacket for the casserole dish is disclosed. This feature is not provided in the present patent.

Des. U.S. Pat. No. 298,403 to Hagberg et al. reveals a casserole holder which is attachable to a casserole dish. The present invention provides an inner insulating member and an outer carrying member which features are not disclosed in the present patent.

Numerous innovations for a casserole container have been provided in the prior art that are adapted to be used. Even though these innovations may be suitable for the specific individual purposes to which they address, they would not be suitable for the purposes of the present invention as heretofore described.

SUMMARY OF THE INVENTION

In accordance with the present invention, a casserole container includes a thermal jacket which comprises a thermal jacket basin and a thermal jacket rim. A thermal jacket hem, secured around the outer edge of the thermal jacket rim, provides an ornamental quality to the thermal jacket. The thermal jacket is manufactured from a generally lightweight, flexible insulative material which can be expanded and/or contorted to receive casserole dishes of varying sizes and shapes. The thermal jacket rim, which is elastic, is opened to allow a casserole dish to be placed therein. The dish is supported by the thermal jacket basin while the thermal jacket rim is secured over the top of the dish, thereby ensuring that the same is properly insulated. The thermal jacket fits securely within a transport member, which is manufactured from a generally stronger and heavier material such as cloth or wool. The transport member comprises a transport member top integrally woven to a transport member basin. The transport member further comprises transport member handles integrally woven to the transport member basin. A transport member slit bisects the transport member, creating an opening along one side of the transport member. A transport member top draw string, housed within an open channel formed along the leading edge of the transport member top, enables the same to be closed and opened. The thermal jacket containing the casserole dish is placed within the transport member, the transport member top is then pulled over and the transport member top draw string is then tied and tightened, securing the casserole dish inside the transport member.

Accordingly, it is an object of the present invention to provide a casserole container which allows for the easy and convenient portage of a casserole dish.

More particularly, it is an object of the present invention to provide a casserole container which provides an insulated storage facility for a casserole dish when the same is be transported.

Another feature of the present invention is that the casserole container is easily carried by means of the two transporter handles.

Yet another feature of the present invention is that the flexible characteristics of the device enable the same to be used on a variety of dishes having varying sizes and shapes.

Another feature of the present invention is that the device is small and lightweight, and is easy to carry and store.

Still yet another feature of the present invention is that the thermal jacket and the transporter are water proof, preventing the escape of liquids from the casserole dish.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

BRIEF LIST OF REFERENCE NUMERALS UTILIZED IN THE DRAWING

10—casserole container (10)
12—thermal jacket (12)
12A—thermal jacket rim (12A)
12AA—thermal jacket hem (12AA)
12B—thermal jacket basin (12B)
14—transport member (14)
14A—transport member top (14A)
14AA—transport member top hem (14AA)
14AB—transport member top draw string (14AB)
14AC—transport member top slit (14AC)
14AD—transport member top rim (14AD)
14B—transport member basin (14B)
14C—transport member handles (14C)
16—casserole dish (16)

BRIEF DESCRIPTION OF THE PREFERRED EMBODIMENT

DETAILED DESCRIPTION OF THE PREFERRED EMBODIMENT

Figure 1:
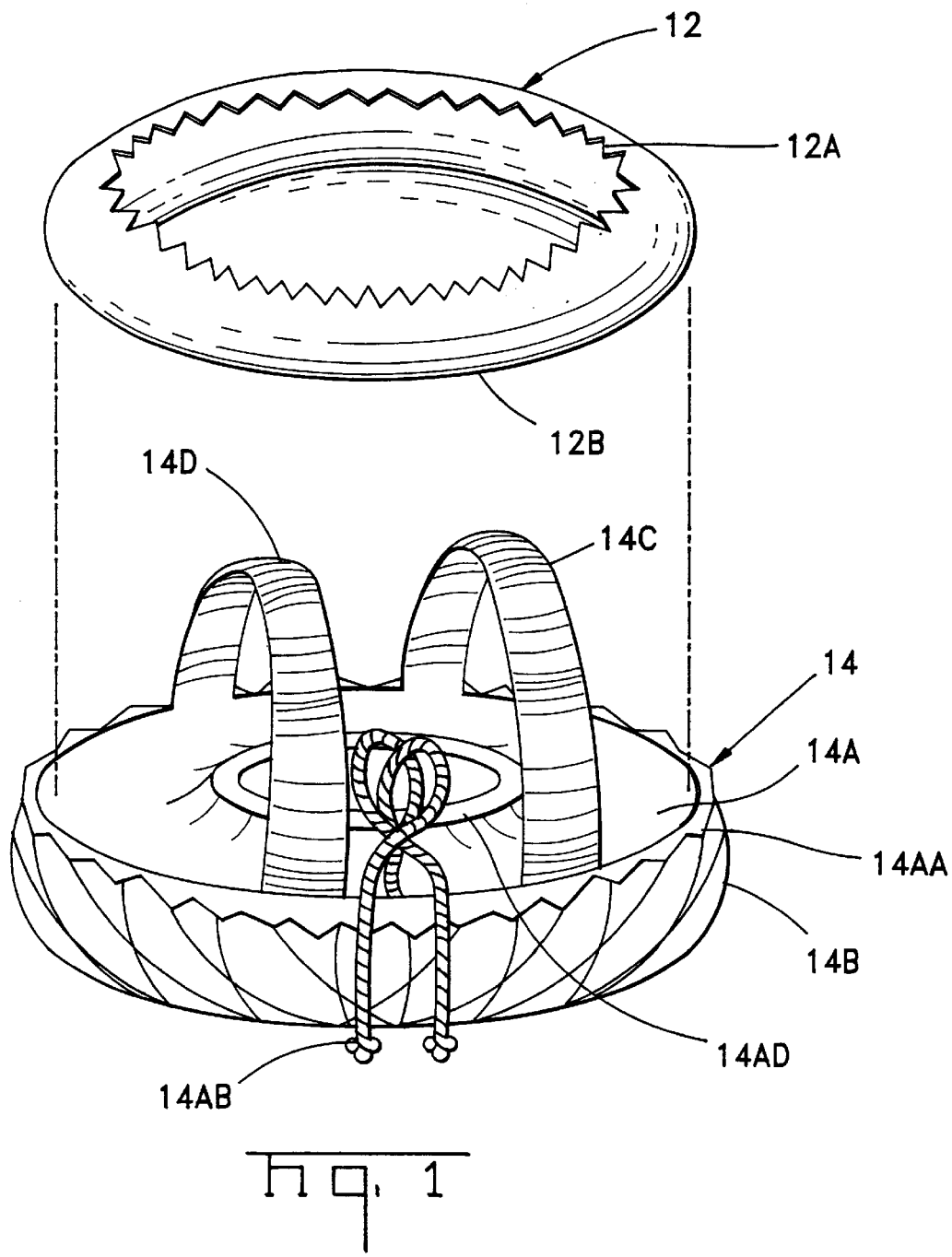
FIG. 1 is a top perspective view of the thermal jacket removed from the transport member.

Firstly, referring to FIG. 1 which is a top perspective view of the thermal jacket (12) removed from the transport member (14) which is then secured within the casserole container (10) and exhibiting the following features: thermal jacket (12); thermal jacket rim (12A); thermal jacket hem (12AA); thermal jacket basin (12B); transport member (14); transport member top (14A); transport member top hem (14AA); transport member top draw string (14AB); transport member top slit (14AC); transport member top rim (14AD); transport member basin (14B); transport member handles (14C); and casserole dish (16). The casserole container (10) is designed to function as a convenient and safe method of transporting casserole and other similar dishes. Accordingly, the casserole container (10) provides a thermal jacket (12) which functions as an insulating means for heated casserole dishes (16). To accomplish this, the thermal jacket (12) is manufactured from a generally lightweight, flexible insulative material which can be expanded and/or contorted to receive casserole dishes (16) of varying sizes and shapes. The thermal jacket (12) comprises a thermal jacket basin (12B) which is open on one end. A thermal jacket rim (12A), secured along the leading edge of the thermal jacket basin (12B), is comprised of an elastic material which enables the same to be stretched outwardly. Consequently, the thermal jacket rim (12A) is pulled over and around a casserole dish (16), under the casserole dish (16) meets the bottom of the thermal jacket basin. The elastic character of the thermal jacket rim (12A) enables the same to be secured over a portion of the top of the casserole dish. A thermal jacket hem (12AA), secured around the outer edge of the thermal jacket rim (12A), provides an ornamental design for the thermal jacket (12).

The thermal jacket (12) is insertable within a transport member (14), which is manufactured from a woven cloth or wool. The transport member (14) is intended to provide a means for securing and carrying the insulated casserole dish (16). The transport member (14) comprises a transport member top (14A) integrally woven to a transport member basin (14B). The transport member top (14A) forms a generally circular opening having a transport member top draw string (14AB) housed within an open channel formed by a transport member top rim (14AD) located along the leading edge of the opening of the transport member top (14A). A transport member top slit (14AC) bisecting the transport member top (14A) and the transport member basin (14B) provides a means by which the transport member (14) can be opened and closed. The transport member top draw string (14AB) protrudes outwardly from either opening formed by the transport member top slit (14AC). The thermal jacket (12) containing the casserole dish (16) is placed within the transport member (14) by opening the same at the point where the transport member top slit (14AC) bisects the transport member (14). The transport member (14) is then pulled over and around the thermal jacket (12) securing the casserole dish (16) therein. The transport member top draw string (14AB) is then tightened and formed into a releasable knot to secure the casserole dish (16). A transport member top hem (14AA) secured along the outer edge of the transport member top (14A) provides an ornamental design for the casserole container (10). The transport member (14) further comprises transport member handles (14C) integrally woven to the transport member basin (14B). The transport member handles (14C) have an arc-like configuration and are intended to be grasped by the human.

Figure 2:
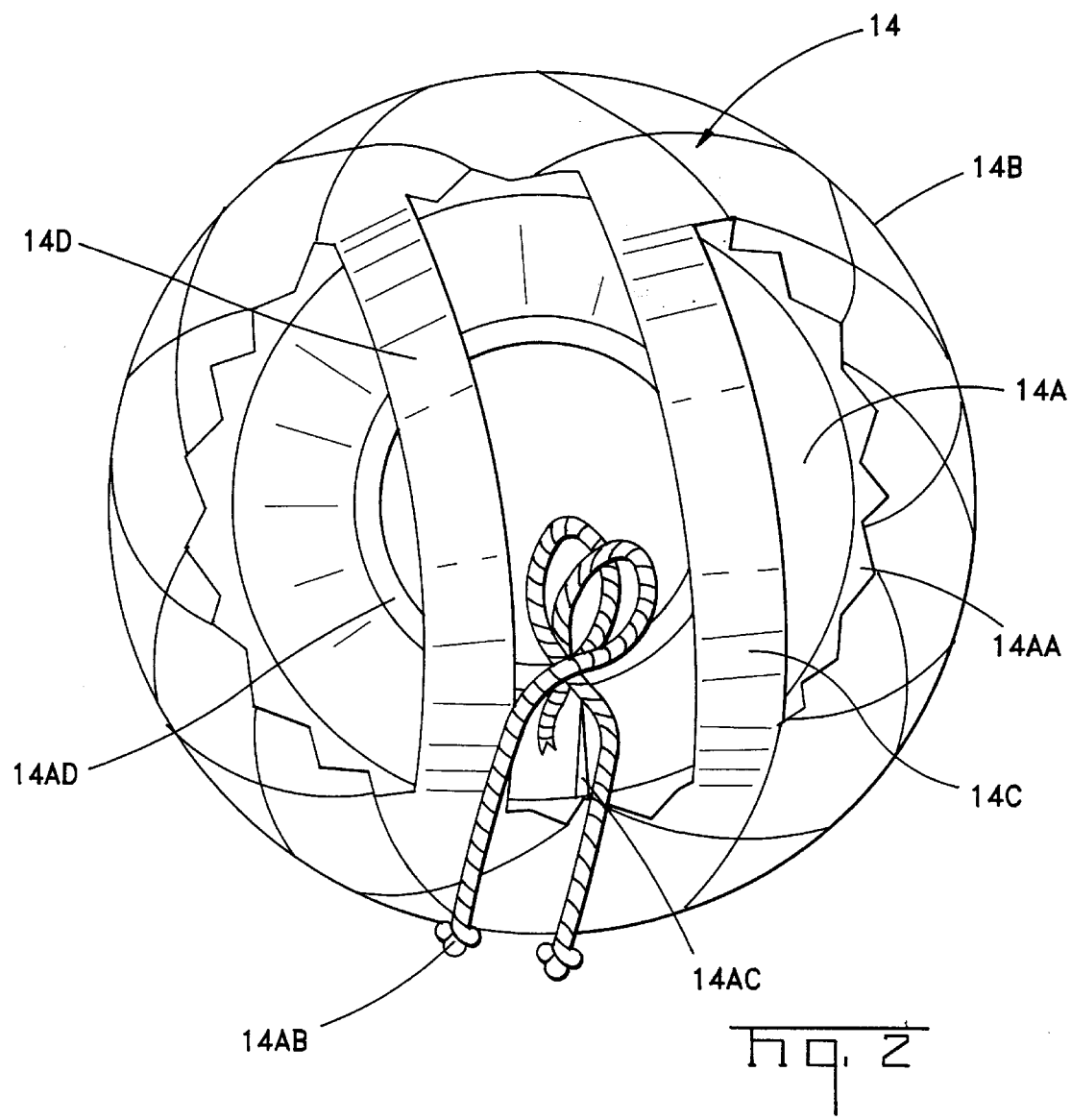
FIG. 2 is a top view of the casserole container with the thermal jacket and transport member secured therein.

Now referring to FIG. 2 which is a top view of the casserole container (10) with the thermal jacket (12) and transport member (14) secured therein. The transport member (14) has a generally circular configuration but, because of the flexible characteristics of the woven cloth or wool, the transport member (14) can also accept casserole dishes (16) which have other shapes.

Figure 3:
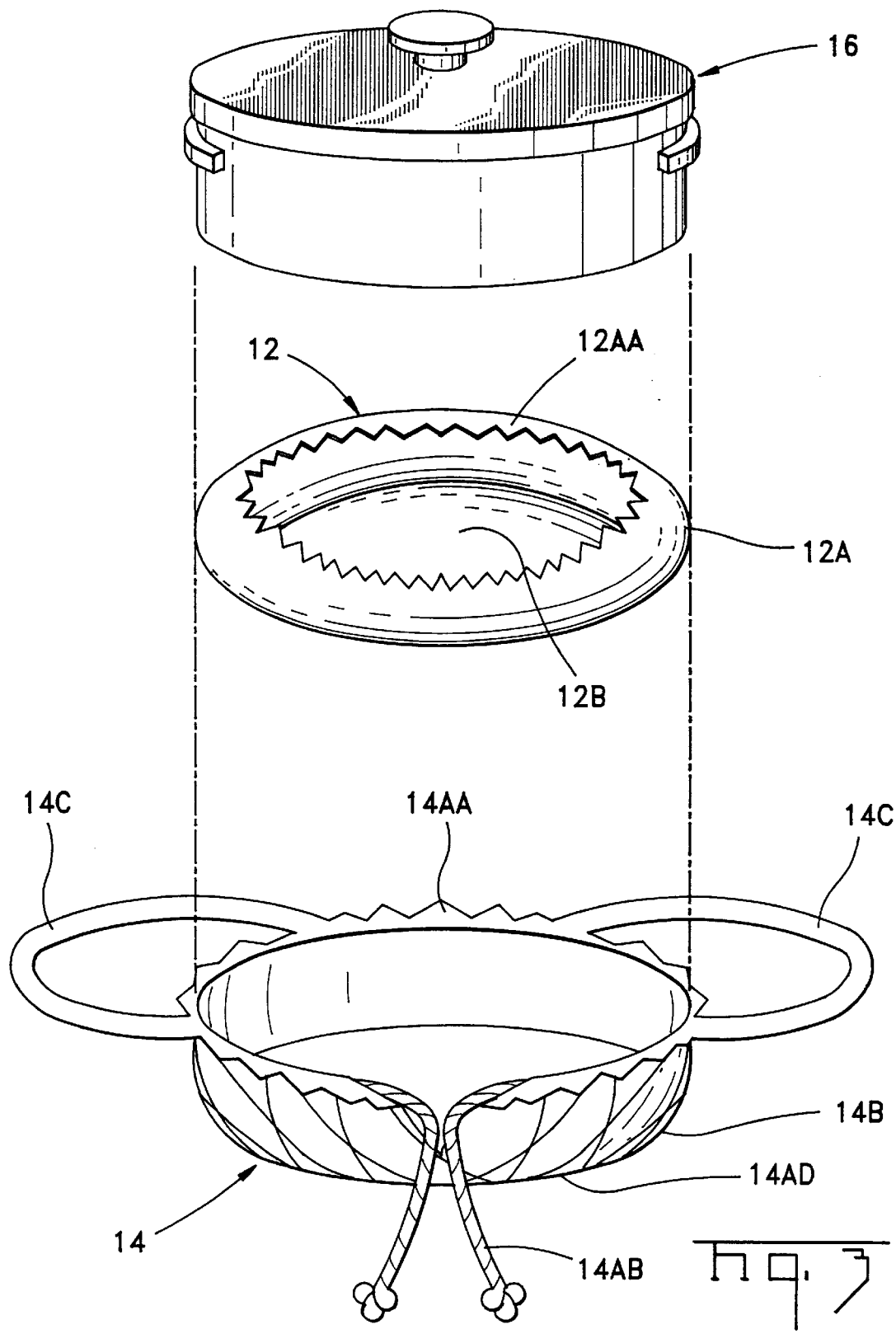
FIG. 3 is a side view of a casserole dish inserted into the thermal jacket, which is then inserted into the transport member.

Now referring to FIG. 3 which is a side view of a casserole dish (10) inserted into the thermal jacket (12), which is then inserted into the transport member (14).

Figure 4:
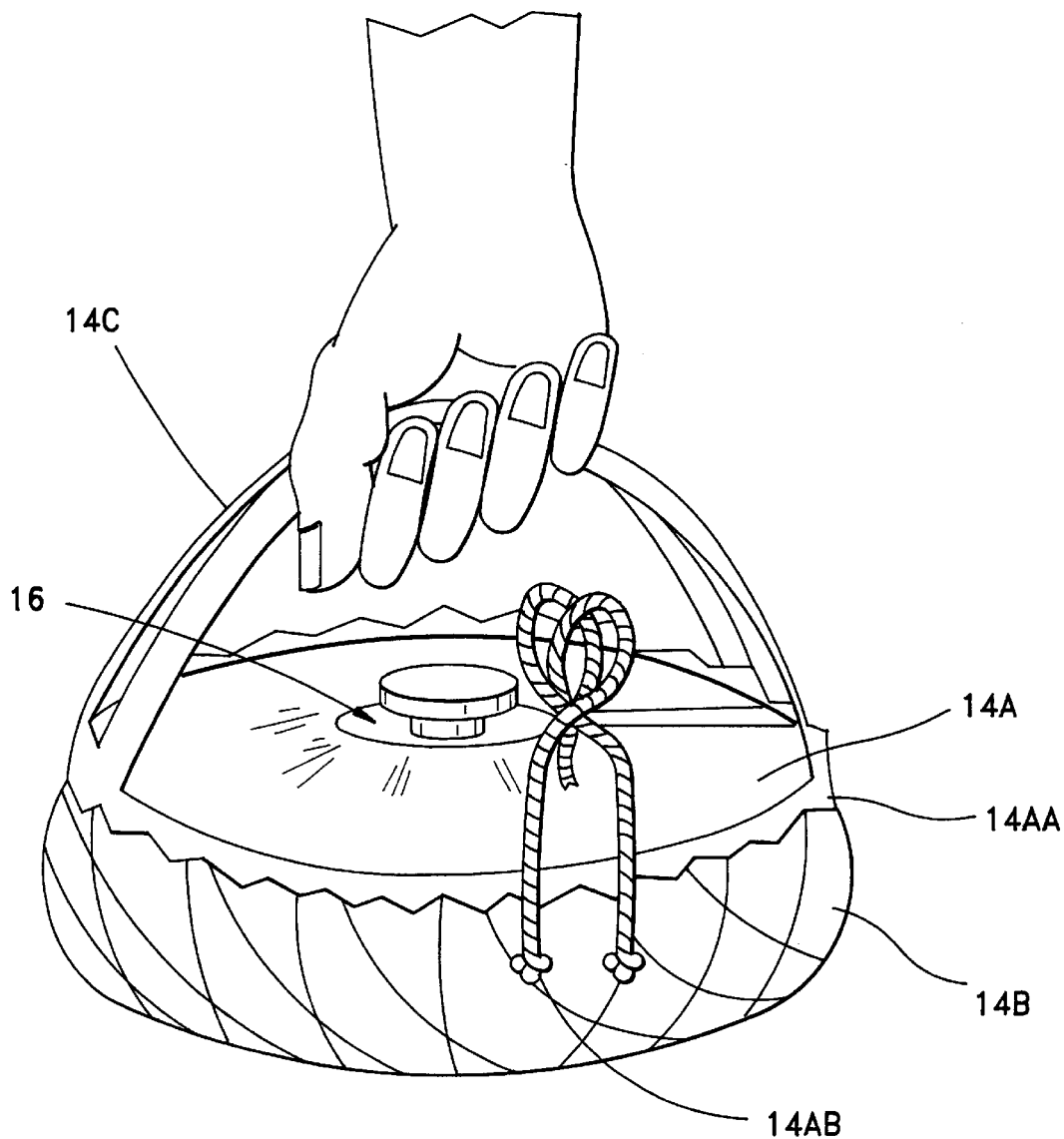
FIG. 4 is a side perspective view of the casserole container as the same is carried using the transport member handles.

Now referring to FIG. 4 which is a side perspective view of the casserole container (10) as the same is carried using the transport member handles (14C).

It will be understood that each of the elements described above, or two or more together, may also find a useful application in other types of constructions differing from the type described above.

While the invention has been illustrated and described as embodied in a casserole container, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by letters patent is set forth in the appended claims:

What is claimed is:

1. A casserole container (10) comprising:

A) a thermal jacket (12) which comprises a thermal jacket basin (12B) having a thermal jacket rim (12A) disposed along a leading edge of an opening formed on one end of the thermal jacket basin (12B), the thermal jacket (12) further comprises a thermal jacket hem (12AB) which is integrally stitched along an outer edge of the thermal jacket rim (12A); and B) a transport member (14) comprising a transport member top (14A) integrally woven to a transport member basin (14B), the transport member top (14A) forms an opening having a transport member top draw string (14AB) housed within an open channel formed by a transport member top rim (14AD) located along the leading edge of the opening of the transport member top (14A), a transport member top hem (14AA) is integrally stitched along the outer edge of the transport member top (14A), the transport member (14) further comprises a transport member top slit (14AC) which bisects the transport member top (14A) and the transport member basin (14B), the transport member top slit (14AC) provides an opening whereby casserole dishes are insertable within the transport member (14), the transport member top draw string (14AB) protrudes outwardly from either opening formed by the transport member top slit (14AC), the transport member (14) further comprises transport member handles (14C) integrally woven to the transport member basin (14B), the casserole containing dish is placed within the thermal jacket (12), then the thermal jacket (12) is placed within the transport member (14) which is drawn closed by pulling the transport member top draw string (14AB) and tying to secure the thermal jacket (12) within the transport member (14).

2. The casserole container (10) as described in claim 1, wherein the thermal jacket (12) is manufactured from a lightweight, flexible insulative material which can be expanded and contorted to receive various sized and shaped casserole dishes (16).

3. The casserole container (10) as described in claim 1, wherein the thermal jacket rim (12A) is manufactured from an elastic material which enables the same to be stretched outwardly.

4. The casserole container (10) as described in claim 1, wherein the transport member (14) is manufactured from a material selected from a group consisting of woven cloth and wool.

5. The casserole container (10) as described in claim 1, wherein the transport member top draw string (14AB) is tightenable and formed into a releasable knot to secure the casserole dish (16) within the transport member (14).

* * * * *